Jan. 21, 1964     K. RUBNER     3,118,529
FRAME FOR A ROLLER OF A CONVEYOR
Filed Sept. 21, 1960     2 Sheets-Sheet 1
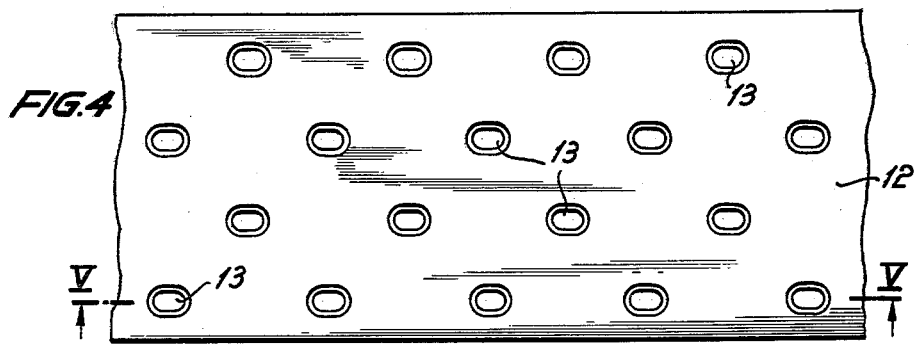
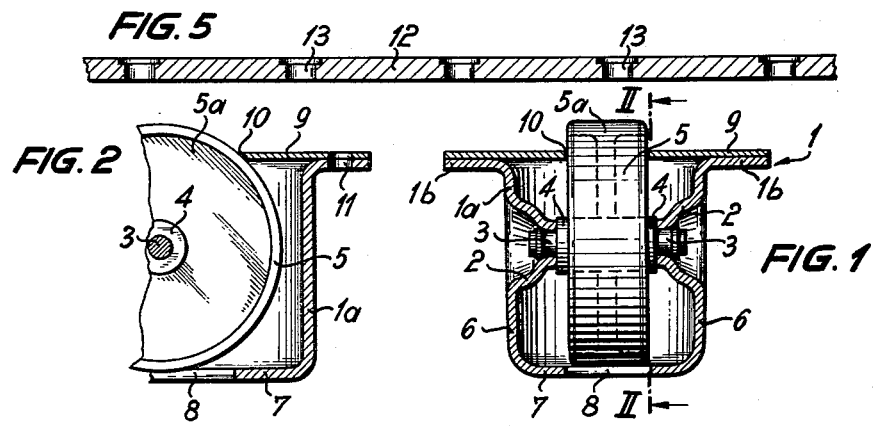
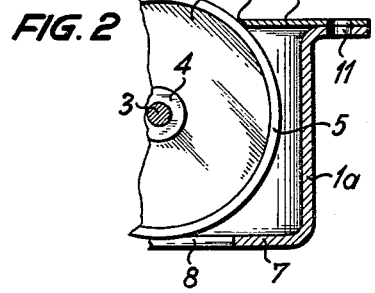
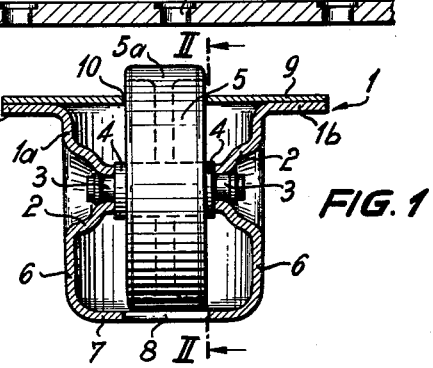
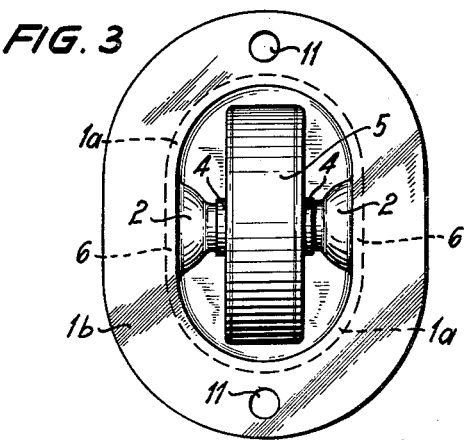
INVENTOR
K. Rubner
By Glascock Downing Seebold
ATTYS

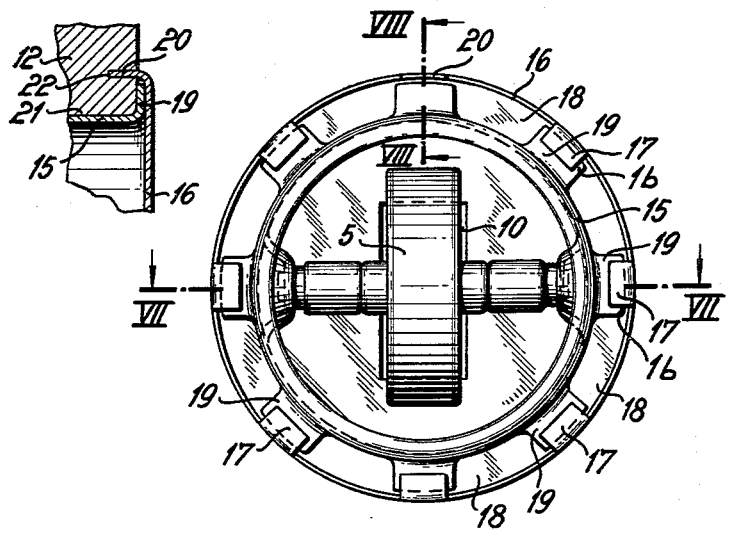
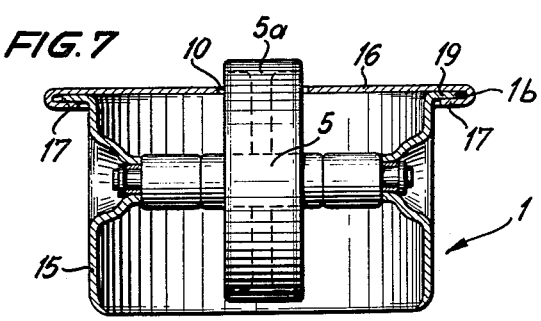

United States Patent Office 3,118,529
Patented Jan. 21, 1964

3,118,529
FRAME FOR A ROLLER OF A CONVEYOR
Karl Rubner, Mellrichstadt, Bavaria, Germany, assignor to Fa-Ge-Rubner, Mellrichstadt, Bavaria, Germany
Filed Sept. 21, 1960, Ser. No. 57,433
Claims priority, application Germany Sept. 24, 1959
5 Claims. (Cl. 193—37)

The invention relates to a frame, receiving a roller, and having a support resting against against a fixed part of a conveyor, located between the rolling surface of the roller loaded by a crate or the like, and its spindle, so that a part of the roller projects beyond the support.

It is known to combine frames with several rollers of certain lengths to conveyors for moving solid material or objects of certain dimensions. These objects are shifted on the rollers of these frames by hand or moved by the force of gravity. These frames are usually assembled from several channel profiles, the supports of which rest on the fixed part of the conveyor. Between the channel-profile members, there are fitted continuous axles or spindles, on which the individual rollers are arranged. From this design, it results necessarily that the lengths and diameters of the spindles are a function of the distances between the channel profile members. Heavier or larger objects to be conveyed necessitate the use of wide rolling tracks, with rollers spaced at small intervals or in an offset arrangement. Hitherto used designs have the disadvantage of requiring a certain roller arrangement. The rollers may be fitted only on the spindles mounted between the beams, so that larger distances between these beams require correspondingly thicker spindles or several beams must be used with smaller distances thereinbetween. In both cases, the manufacture is comparatively expensive and time-wasting. Wear of the objects carries results in the accumulation of dirt on the frames which is rather difficult to remove.

It is the object of this invention to eliminate these disadvantages and to provide single frames, each with one roller which may be arranged in any desired manner.

It is a further object of the invention to simplify the assembly of the individual frames in the conveyor.

It is a further object of the invention to simplify the design of the frames so that that their manufacture is less expensive.

According to the invention this object is realized in that a laterally closed, pot-shaped housing, receiving a single roller, embraces the major part of the roller below the projecting part of the same; the housing has, by way of support, a supporting flange which supports the frame on the upper edge of an opening of a support plate, said opening firmly surrounding this housing.

This design provides a frame, receiving a single roller, the shape of the frame being such that it may be arranged in a support plate in any desired way. Since the frame is arranged in an opening of the support plate surrounding it, it ensures its safe and twist-proof mounting therein. Thus, a single, standard, design may be applied to a large number of various operating conditions, quite irrespective of whether these relate to different loads or different dimensions of the objects to be conveyed, or to curves or the like, simply by arranging the frames closer together or at larger intervals, or at an appropriate angle relative to the preceding frame.

The invention will be further described, by way of example, with reference to the accompanying drawing, in which:

FIG. 1 is a vertical axial cross-section through a frame according to the invention;

FIG. 2 is a fragmentary cross-section along the line II—II of FIG. 1;

FIG. 3 is a top view of the frame of FIG. 1 after the removal of a cover;

FIG. 4 is a support plate with a large number of openings for receiving the frames of FIGS. 1 to 3, drawn on a different scale;

FIG. 5 is a cross-section along the line V—V of FIG. 4;

FIG. 6 is a bottom view of another embodiment of a frame according to the invention;

FIG. 7 is a cross-section along the line VII—VII of FIG. 6; and

FIG. 8 is a fragmentary cross-section along the line VIII—VIII of FIG. 7 with part of the support plate.

Referring now to FIGS. 1 to 3, there is shown therein a laterally closed, pot-shaped housing 1a of a frame 1, having a support flange 1b which surrounds the housing 1a. The housing 1a has also two holders 2 for a carrier 3 of a hub 4 of a roller 5. Said holders 2 are pressed inwards into housing 1a from both sides into oppositely located parts of the wall 6. The holders 2 and the support flange 1b are interconnected by a lower lateral cross-member 7.

The bottom of the pot-shaped housing has an opening 8 through which lubricating oil and dirt may be removed. The top is closed by a cover 9. This cover 9 has an opening 10 which is so dimensioned that it allows the part 5a of the roller 5, which projects beyond the cover, to pass therethrough. The support of roller 5 on roller carrier 3 is effected by ball or needle bearings as known to the art. The frame may be fitted to a support plate also by screws passing through the bores 11.

The frame 1 is adapted to be fitted into a support plate 12, as shown, for example, in FIGS. 4 and 5. Such a support plate has several rows of openings 13, the form of which is adapted to the form of housing 1a of frame 1, and which firmly surround said housing 1a. In each of these apertures 13, one frame 1 of FIGS. 1 to 3 may be fitted or pressed in. As shown in FIG. 4, the assembly may be effected in several rows, the frames of the various rows being mutually offset or staggered. The apertures 13 may be so arranged that the frames fitted thereinto form an angle with the preceding frames, causing a curve to be produced.

The oval shape of apertures 13, collaborating with the oval shape of the frames shown in FIG. 3, has the advantage that the frame is fitted into the aperture of plate 12, relative to the desired plane of rotation of the roller in such a way that it cannot twist so that the roller spindles are made secure against displacement. The plates 12 may be made from sheet metal, plywood, wood, synthetic resin or the like.

The advantage of the frame according to the invention is that it is very easily assembled, that it consists of a single unit, and that it affords an excellent protection for the roller bearings. The covers 9 may be detachable or may be fixed, for example by pressing or welding, to the housing 1a, or its flanges 1b, respectively.

A further advantage of the invention is that the arrangement of the frames makes it possible to achieve a better specific load distribution of the objects to be carried, for example, crates. The pot-shaped housing may also have an oblong, elliptic or similar shape.

The frame shown in FIGS. 6 to 8 has a pot-shaped cylindrical housing 15 with circular cross-section. The roller 5 is arranged as described hereinbefore. The top of housing 15 is equipped with a cover 16, equipped with lips 17 which are bent about the support flange 1b of housing 15, and assembled in this manner. The support flange 1b differs from the embodiments of FIGURES 1 to 3 by recesses 18, which have the purpose of reducing its weight. The parts 19, remaining between the recesses 18, are wider than the cover lips 17. Thereby the burrs caused by the stamping of the cover lips 17 are pressed into the remaining parts 19 of the support flange, when the cover lips 17 are folded over.

The cover 16 has also at least one support lip or locating lip 20, as shown in FIGS. 7 and 8, bent in such a way that it is substantially parallel to the cylindrical surface of housing 15. This housing lip 20 may engage into a recess of the support plate 12, a fragment of which is shown in the drawing, and which receives the frame 1, so that the frame is made secure against twisting. In this case the support plate 12 has, for every frame 1, a circular bore 21, receiving the housing, and the diameter of which bore corresponds to that of cylindrical housing 15. In a suitable position, adjacent bore 21, there is provided a recess 22 into which engages the locating lip 20. It is also possible to mill a groove into the bore of the support plate 12, into which the locating lip 20 may engage. Preferably, the recess 22 or the groove are so dimensioned that locating lip 20 engages thereinto with a press fit.

Parts of the frame may be made from metal or synthetic resins.

What I claim is:

1. A frame for a roller of a conveyor comprising a generally pot-shaped housing open at one end, portions of said housing defining aligned openings therein, a roller having a centrally disposed opening therethrough positioned in said housing, an axle extending through the openings in the housing and said roller to support the same whereby a major portion of the roller is within the housing and a minor portion thereof extends outwardly of the open end, a cover mounted over the open end of said housing and having an aperture therein to allow the said minor part of the roller to pass therethrough, a radially extending flange adjacent the open end of said housing, said housing adapted to be inserted into an opening in a stationary part of a conveyor, and said engageable on the stationary part of the conveyor to support said housing.

2. A frame as defined in claim 1, wherein the rim of the cover includes portions defining lips which embrace the radially extending flange of the housing.

3. A frame as defined in claim 2, wherein at least one lip projects downwardly, and is spaced from the cylindrical surface of the housing, said lip engageable into a recess of the stationary part of the conveyor to secure the housing in the opening therein.

4. A frame as defined in claim 3, wherein the radially extending flange of the housing has portions defining a plurality of circumferentially spaced recesses, and certain of said lips on said cover embrace the portions of said flange between the recesses.

5. A frame for the roller of a conveyor having support means engageable with a fixed portion of a conveyor, disposed between the rolling surface of the roller and its axis whereby a part of the roller projects beyond the support means, said frame comprising a generally cylindrical housing, oppositely disposed portions of said housing having aligned openings therein, the roller having a major portion thereof in said housing, an axle extending through the aligned openings in said housing and through said roller, said support means on the housing comprising an outwardly extending flange, a cover member on said housing and having means in engagement with said support flange to secure the same thereto, said cover member having portions defining an opening therein through which a portion of said roller projects, and said frame adapted to be positioned in an opening in a plate with the wall portions of the opening in surrounding engagement with said housing.

References Cited in the file of this patent

UNITED STATES PATENTS

| | | |
|---|---|---|
| 865,693 | Fromherz | Sept. 10, 1907 |
| 1,743,255 | Vervoort | Jan. 4, 1930 |
| 2,253,141 | Schofield | Aug. 19, 1941 |
| 2,759,585 | Timmons | Aug. 21, 1956 |